United States Patent [19]

Lindsley

[11] Patent Number: 5,301,138
[45] Date of Patent: Apr. 5, 1994

[54] DEVICE AND METHOD FOR EVALUATING LOGARITHMS

[75] Inventor: Brett L. Lindsley, Highwood, Ill.

[73] Assignee: Motorola, Inc., Schaumburg, Ill.

[21] Appl. No.: 19,988

[22] Filed: Feb. 17, 1993

Related U.S. Application Data

[63] Continuation of Ser. No. 898,393, Jun. 11, 1992, abandoned, which is a continuation of Ser. No. 555,321, Jul. 19, 1990, abandoned.

[51] Int. Cl.$^5$ .............................................. G06F 1/02
[52] U.S. Cl. ................................................. 364/748.5
[58] Field of Search ................ 364/748.5, 722; 341/75

[56] References Cited

U.S. PATENT DOCUMENTS

| | | | |
|---|---|---|---|
| 3,631,230 | 12/1921 | Chen | 364/748.5 |
| 4,062,014 | 12/1977 | Rothgordt et al. | 364/748.5 |
| 4,089,060 | 5/1978 | Mitchell | 364/722 |
| 4,583,180 | 4/1986 | Kmetz | 364/748.5 |
| 4,626,825 | 12/1986 | Burleson | 341/75 |
| 4,791,403 | 12/1988 | Mitchell et al. | 364/748.5 |

*Primary Examiner*—David H. Malzahn
*Attorney, Agent, or Firm*—Darleen J. Stockley

[57] ABSTRACT

A logarithm of an input value is computed utilizing a function generator to generate a first logarithm of an approximation value of the input value, scaled to a natural logarithm value where the first logarithm is not a natural base logarithm, and then combined with a correction value, obtaining a natural base logarithm of the input value. An error value, related to the input value and the approximation value, is generated and is utilized in a specified power series to determine the correction value. The natural base logarithm obtained is scaled by a natural base logarithm of a desired base of a desired output logarithm, thereby determining the desired output logarithm of the input value that has the desired base.

39 Claims, 2 Drawing Sheets

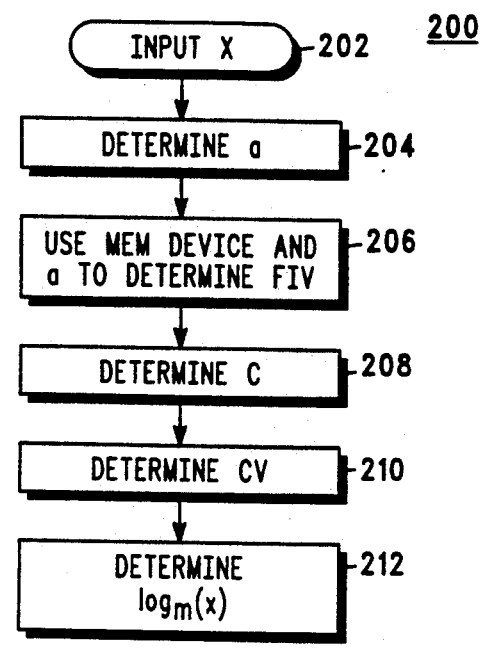
*FIG.2A*
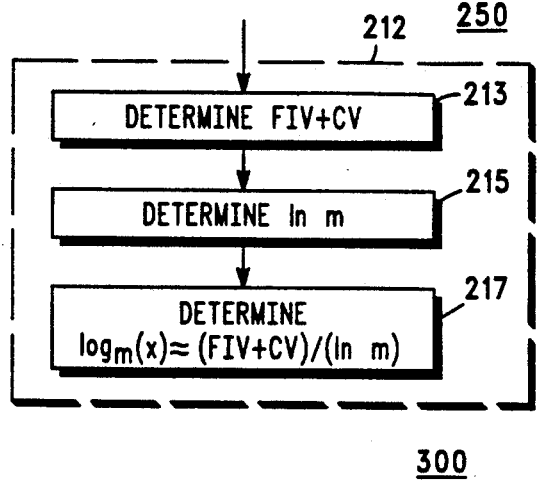
*FIG.2C*
*FIG.3*
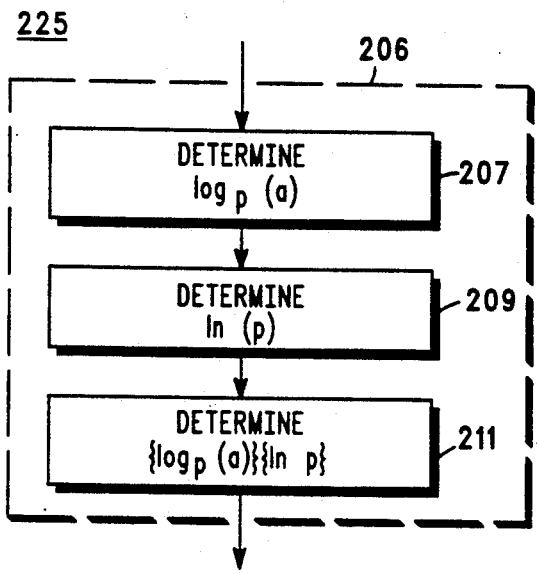
*FIG.2B*
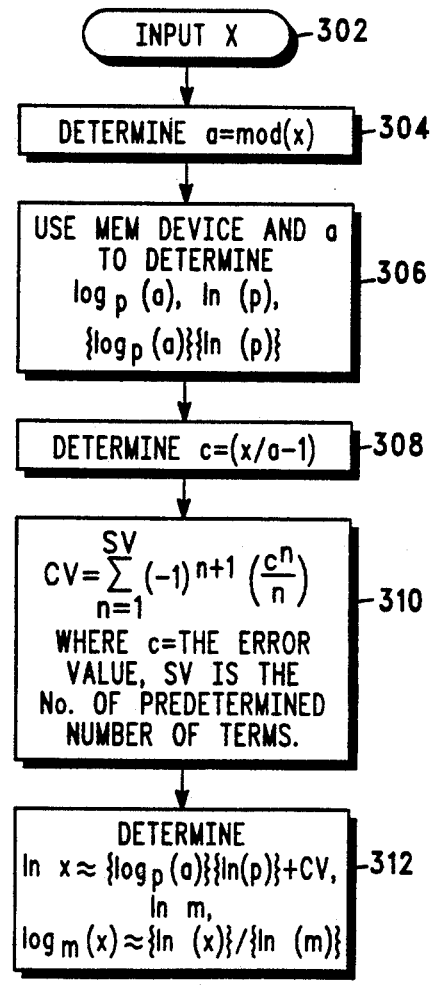

DEVICE AND METHOD FOR EVALUATING LOGARITHMS

This is a continuation of application Ser. No. 07/898,393, filed Jun. 11, 1992, and now abandoned, which in turn is a continuation of application Ser. No. 07/555,321, filed Jul. 19, 1990 and now abandoned

FIELD OF THE INVENTION

This invention is concerned with transcendental function evaluation (TFE). More particularly, this invention is concerned with a method and device for efficient evaluation of logarithm functions.

BACKGROUND OF THE INVENTION

There is a need for more efficient arithmetic circuitry and methods for improving the speed of logarithmic computations in a computer. Present logarithm computing systems typically utilize a hardware fixed point processor with an algorithm based on a CORDIC (COordinate Rotation DIgital Computer) computing technique, such as the logarithm computing system described by Walther in *A Unified Algorithm For Elementary Functions*, Spring Joint Computer Conference, 1971, or in the method of Tien Chi Chen in U.S. Pat. No. 3,631,230. Both the CORDIC and Chen's system require hardware implementation for efficiency. A system that could be implemented entirely in software is needed to provide an alternative of conserving hardware costs and improving physical space requirements.

SUMMARY OF THE INVENTION

A method and apparatus are provided for substantially processing an input value to provide an output logarithm value of the input value, wherein the output logarithm value has a desired base. A modifier utilizes the input value to generate an approximation value, and a first function generator utilizes the approximation value to determine a first intermediate value. The first intermediate value 1) is substantially the natural base logarithm of the approximation value, obtained directly from a first function generator that generates a preselected natural base logarithm in the case where the desired base of the output logarithm value is e, and, 2) in the case where the desired base of the first function generator logarithm value is different from e, is substantially a product of a logarithm of the approximation value determined to the desired base of the first function generator multiplied by a natural base logarithm of the desired base of the first function generator.

An error generator utilizes the input value and the approximation value to provide an error value. The correction evaluator utilizes the error value and a predetermined number of terms of a particular power series to provide a correction value. A combiner determines the output logarithm value: 1) obtained directly as a sum of the intermediate value and the correction value where the intermediate value is a natural base logarithm, and, 2) obtained as a scaled sum of the intermediate value plus the correction value, scaling consisting essentially of division of both terms individually or the composite sum of the two terms, as desired, by a natural base logarithm of the desired base of the output logarithm value.

BRIEF DESCRIPTION OF THE DRAWINGS

FIG. 2A is a general flow chart of an implementation of the method of the invention; FIG. 2B sets forth one implementation of a step of determining a first intermediate value; and FIG. 2C sets forth one implementation of a step of determining $\log_m(x)$.

FIG. 3 is a flow chart of an implementation of the method of the invention to provide an output logarithm value of the input value to a base m.

BEST MODE FOR CARRYING OUT THE INVENTION

Figure 1A:
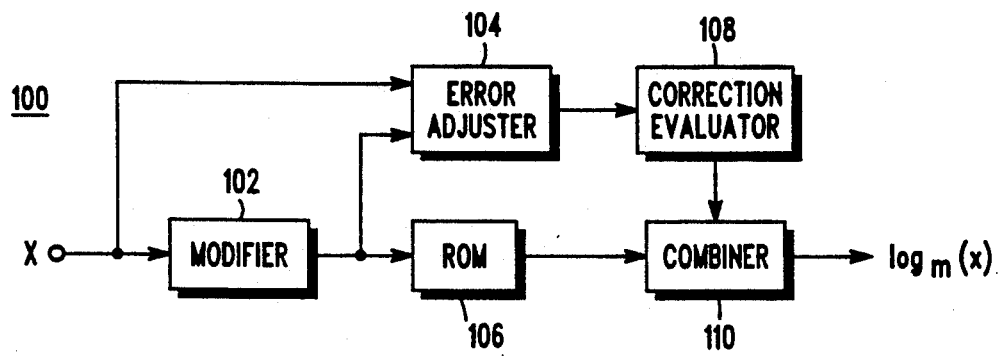
FIG. 1A is a block diagram of a computer hardware implementation of the invention.

FIG. 1A, generally depicted by the numeral 100, sets forth one embodiment of a computer hardware implementation of the invention. A modifier (102) utilizes an input value to determine an approximation value, the approximation value being selected from a predetermined set of values. The predetermined set of values typically is a group of approximation values determined by selected rounding algorithms, thereby providing the approximation value as a value having a number of bits of precision less than or equal to a number of bits of precision of the input value.

Figure 1B:
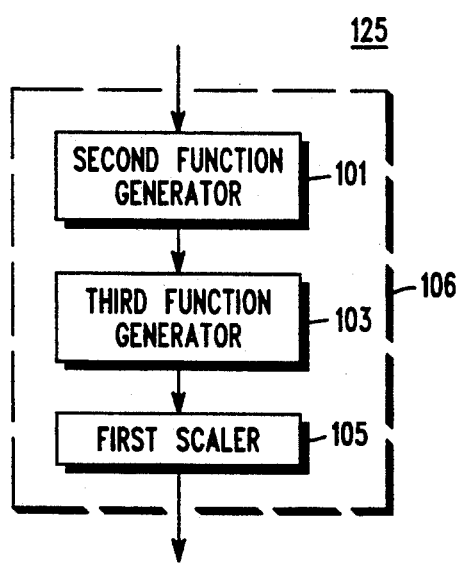
FIG. 1B sets forth one embodiment of a first function generator of FIG. 1A.

A first function generator (106), an embodiment of which is set forth in FIG. 1B (numeral 125), utilizes the approximation value to determine a first intermediate value, the first intermediate value substantially being a natural base logarithm of the approximation value. Typically the first function generator (106) utilizes at least a ROM, a look-up table, or other memory device as a second function generator (101) to determine a first logarithm value having a predetermined base, utilizes a third function generator (103) to obtain a second natural base logarithm value of the predetermined base of the first logarithm value, and utilizes a first scaler (105) to determine a product of the first logarithm value and the second logarithm value, being substantially the first intermediate value. It is clear that where a first logarithm value has a base e, determination of a logarithm of the predetermined base of the first logarithm value may be omitted, since the value of that logarithm simply provides a scaling multiplicative factor of one, and the first logarithm value is substantially the first intermediate value.

Typically in a software implementation the first function generator also scales the approximation value by an at least one implementation dependent constant to obtain at least one first integral valued index for a memory device. The memory device utilizes the at least one first integral valued index to determine a first logarithm value having a predetermined base and a second natural base logarithm value. It will be obvious to one skilled in the art that numerous memory devices may be used to determine the first logarithm value and the second logarithm value.

A typical hardware implementation may directly manipulate bit patterns of the approximation value to obtain the at least one second integral index value, that value being then utilized to determine the first logarithm value and the second logarithm value. It will be obvious to one skilled in the art that the first integral valued index obtained from a software implementation may differ from the second integral valued index created in a hardware implementation.

Figure 1C:
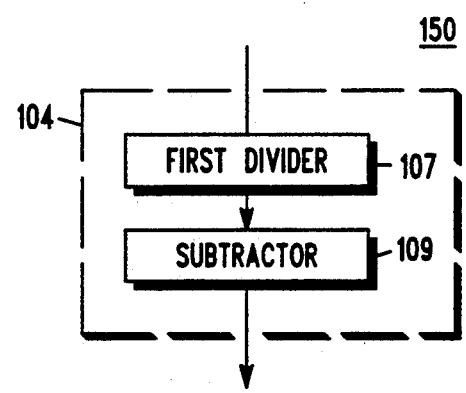
FIG. 1C sets forth one embodiment of an error generator of FIG. 1A.

An error generator (104), an embodiment of which is set forth in FIG. 1C (numeral 150), substantially obtains an error value by utilizing a first divider (107) to determine a first quotient of the input value divided by the approximation value and a subtractor (109) to determine a difference of the first quotient minus one. It is clear that, equivalently, the subtractor could be utilized to obtain a difference value of the input value minus the approximation value, and the first divider could be utilized to obtain a related primary quotient of that difference value divided by the approximation value.

A correction evaluator (108) substantially obtains a correction value by implementing a determiner to utilize the error value together with a predetermined number of terms of a predetermined mathematical series for substantially evaluating a predetermined number of terms, and for substantially summing the evaluated predetermined number of terms obtained thereby, obtaining a second sum, the second sum being substantially the correction value. Typically, the predetermined mathematical series is a power series of the form:

$$\sum_{n=1}^{\infty} (-1)^{n+1} \left( \frac{c^n}{n} \right)$$

where c = the error value. More particularly, the correction value is substantially obtained by truncating the predetermined mathematical series to the predetermined number of terms and evaluating the terms:

$$CV = \sum_{n=1}^{SV} (-1)^{n+1} \left( \frac{c^n}{n} \right)$$

where c = the error value and SV = number of the predetermined number of terms.

The number (SV) of the predetermined number of terms, typically integrally valued, of the predetermined mathematical series is substantially a selected value, the selected value being typically a value greater than or equal to one less than a third quotient of a desired number of bits of accuracy of the output logarithm value divided by a quantity consisting of a number of bits of accuracy of the first function generator. To achieve a desired degree of accuracy for the output logarithm value, the selected value, when utilized as described above, must be at least equal to one less than the third quotient.

Figure 1D:
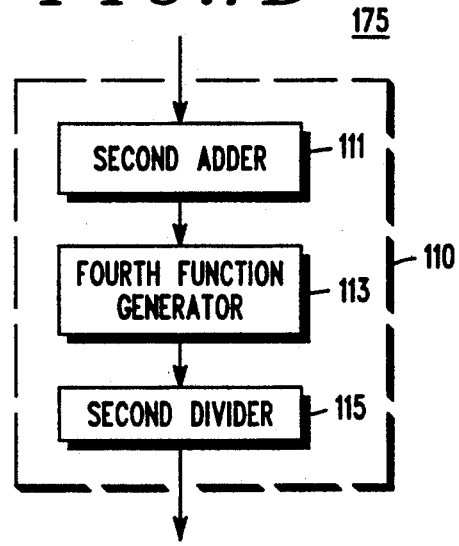
FIG. 1D sets forth one embodiment of a combiner of FIG. 1A.

A combiner (110), an embodiment of which is set forth in FIG. 1D (numeral 175), utilizes the first intermediate value and the correction value to obtain the output logarithm value. Typically, the combiner 1) applies a scaling operation to both the correction value and the first intermediate value, and adds both scaled values, or, 2) equivalently, utilizes a second adder (111) to add the correction value to the first intermediate value and obtain a second sum, utilizes a fourth function generator (113) to determine a third logarithm value, typically a natural base logarithm of the desired base of the output logarithm value, and utilizes a second divider (115) to scale the second sum by dividing that sum by the third logarithm value. It is clear that where the desired base of the output logarithm is e, the scaling operation comprises division by one, and may be omitted.

FIG. 2A is a general flow chart of an implementation of the method of the invention, FIG. 2B and FIG. 2C more particularly specifying certain steps as follows: FIG. 2A, generally depicted by the numeral 200, sets forth one embodiment of a sequence of steps implemented in the method of the invention; FIG. 2B, generally depicted by the numeral 206, sets forth an embodiment of one implementation of the step of determining a first intermediate value; and FIG. 2C, generally depicted by the numeral 212, sets forth an embodiment of one implementation of the step of determining $\log_m(x)$.

FIG. 2A illustrates one implementation of the method of the present invention. An input value, x, (202), is modified to obtain an approximation value, $a = \text{mod}(x)$, represented by at least one electrical signal (204). Typically the approximation value is selected from a predetermined set of values, wherein the predetermined set of values is a group of values predetermined by selected rounding algorithms. Thus a substantially has a number of bits of precision less than or equal to the number of bits of precision of x, in accordance with a particular selected rounding algorithm. The approximation value is utilized to determine a first intermediate value (206).

A typical first intermediate value (FIV) determination is set forth in FIG. 2B (numeral 225), wherein a memory device (MEM DEVICE) and a are utilized to determine a first logarithm value of the approximation value such that the first logarithm value has a predetermined base p and is represented by at least one electrical signal (207). In addition, a third natural logarithm value of the predetermined base p is obtained, being represented by at least one electrical signal (209). The FIV is substantially determined as a product of the first logarithm value and the third logarithm value (211). It is clear that where the predetermined base p of the first logarithm value is e, determination of the first logarithm value determines the FIV, thereby eliminating the step of determining the third logarithm value, the third logarithm value being essentially one, and further eliminating the step of determining the product of the third logarithm value and the first logarithm value, that product simply being the first logarithm value. It is also clear that since the FIV is substantially a logarithm of the approximation value, its degree of accuracy (degree to which it represents a logarithm of the input value) is smaller than a degree of precision of the input value. However, the degree of precision of the FIV (degree of refinement to which the logarithm is computed) must be at least as precise as the desired degree of accuracy of the output logarithm.

At least the input value and the approximation value are utilized to determine an error value represented by at least one electrical signal (208). Typically, a first quotient of the input value divided by the approximation value is obtained, and one is subtracted from the first quotient to substantially yield the error value. It is clear that other mathematical computations equivalent to the error value determination just stated may be utilized in place of that step, such as obtaining an initial difference by subtracting the approximation value from the input value and dividing that initial difference by the approximation value.

At least the error value is utilized to determine a correction value represented by at least one electrical signal (210). Typically, the error value is input into a predetermined number of terms of a predetermined mathematical series that are then summed to substantially obtain the correction value. The number of the predetermined number of terms is selectable, and selection depends on the accuracy desired for the output logarithm value. Typically, to provide a correction value that allows the desired degree of accuracy of the output logarithm, a number of the predetermined number of terms is selected to be greater than or equal to one less than the quotient of the desired number of bits of accuracy of the output logarithm value divided by substantially a number of bits of the FIV. The predetermined mathematical series is typically a power series wherein the power series is substantially a Taylor series for a natural logarithm of a first sum of one plus the error value, substantially being:

$$\sum_{n=1}^{\infty} (-1)^{n+1} \left( \frac{c^n}{n} \right)$$

where c = the error value.

As illustrated in FIG. 2A, at least the FIV and the correction value are utilized to substantially obtain the output logarithm value of the input value, the output logarithm having a desired base and being represented by at least one electrical signal (212). More particularly, as set forth in FIG. 2C (numeral 250), generally a second sum of the correction value and the FIV is obtained (213), a fourth natural logarithm of the desired base of the output logarithm value of the input value is obtained (215), and a second quotient of the second sum divided by the fourth logarithm is determined, that quotient being substantially the output logarithm value of the input value, having a desired base and being represented by at least one electrical signal (217).

It is clear that where a predetermined base of the first logarithm value, p, is essentially the natural base e, and the desired base of the output logarithm value of the input value is also essentially the natural base e, the step of determining the FIV (206) simply becomes a step of determining the natural base logarithm of the approximation value, that natural base logarithm substantially being the FIV; similarly, the step of determining the output logarithm value of the input value such that the output logarithm value has a desired base simply becomes a step of determining the second sum of the FIV and the correction value to substantially obtain that output logarithm value.

FIG. 3 sets forth a flow chart of an implementation of the method of the invention to provide an output logarithm value of the input value x to a base m and having a first desired degree of accuracy. The input value x is modified to obtain an approximation value a = mod(x) (304), a being selected from a predetermined set of values, typically a group of values determined by selected rounding algorithms.

At least a memory device and the approximation value, a, are utilized to determine a first intermediate value (FIV) (306), typically in the following manner: a first logarithm value of a $\{\log_p a\}$, having a predetermined base p, having a second predetermined degree of accuracy, and being represented by at least one electrical signal, is determined utilizing a memory device, generally a ROM, wherein numerous types of ROMs including EPROMs, may be selected and a desired degree of accuracy is preselected; the base p of the first logarithm value is utilized to determine a third logarithm value, $\{\ln (p)\}$, having a base e and being represented by at least one electrical signal; and the first logarithm value is scaled by multiplying $\{\log_p (a)\}$ and $\{\ln (p)\}$ to obtain an intermediate product, substantially FIV = $\{\log_p(a)\}\{\ln (p)\}$, substantially being a natural base logarithm of the approximation value, a, having at least the second predetermined degree of accuracy and a base e, substantially being $\{\ln (a)\}$, and being represented by at least one electrical signal. It is clear that when p = e, the first intermediate value is ln a, thereby simplifying the determination of the FIV. The second predetermined degree of accuracy is typically selectable, but is typically less accurate than the desired degree of accuracy of the output logarithm value. However, the degree of precision of the FIV is at least as precise as the desired degree of accuracy of the desired output logarithm value.

At least the input value, x, and the approximation value, a, are utilized to generate an error value, c (308). Typically the input value is divided by the approximation value to obtain a first quotient value, x/a, such that the first quotient value is represented by at least one electrical signal, and one is subtracted therefrom, substantially yielding an error value c, such that c is represented by at least one electrical signal and c substantially equals (x/a−1), or an equivalent determination may be made, such as c = (x-a)/a.

At least the error value, c, is utilized to determine a correction value (310) wherein:

the error value, c, is utilized to obtain a number (SV) of a predetermined number of terms of a predetermined mathematical series, the predetermined number of terms being represented by at least one electrical signal such that the number, SV, of the predetermined number of terms of the predetermined mathematical series is greater than or equal to one less than a second quotient of a desired number of bits of accuracy of the output logarithm value divided by a number of bits of accuracy of the second logarithm value, and the predetermined mathematical series is substantially:

$$\sum_{n=1}^{\infty} (-1)^{n+1} \left( \frac{c^n}{n} \right)$$

where c = the error value; and the predetermined number of terms of the predetermined mathematical series are evaluated and summed to substantially yield the correction value (CV) represented by at least one electrical signal:

$$CV = \sum_{n=1}^{SV} (-1)^{n+1} \left( \frac{c^n}{n} \right).$$

For example, if 24 bits of accuracy is desired for the output logarithm value and the first function generator provides 8 bits of accuracy, SV is typically selected to be equal to $\{(24/8)-1\}$, or equivalently, 2.

At least the first intermediate value and the correction value are utilized to substantially obtain the output logarithm value represented by at least one electrical signal (312). The first intermediate value and the correction value are substantially summed, obtaining a third sum:

$$\ln x \approx FIV + CV \approx \{\log_p(a)\}\{\ln (p)\} + CV,$$

the third sum being substantially the natural base logarithm value of the input value x, {ln (x)}, and being represented by at least one electrical signal. A third quotient of the natural base logarithm value of the input value x, {ln (x)} and a natural base logarithm of m, the desired base of the output logarithm value, {ln (m)}, is determined, yielding substantially $$\{\ln (x)\}/\{\ln (m)\} = \{\log_m (x)\},$$

the output logarithm value with the desired base, {$\log_m$ (x)}, represented by at least one electrical signal. The natural base logarithm value of m may be obtained from a ROM, preselected by preselection of a particular desired m for a system, or otherwise as desired. Again it should be noted, as above, that utilization of natural base logarithms allows for simplification of the stepwise procedure.

It is clear that, in a selected embodiment, the present invention may be implemented entirely in software. It is also clear to those skilled in the art that the order of the steps of the method may be modified. For example, the error value may be computed before the first intermediate value.

I claim:

1. An electrical apparatus for processing an input value to provide an output logarithm approximation value, having a desired degree of accuracy and being represented by at least one electrical signal, of the input value, such that the output logarithm approximation value has a desired base, comprising:
   A) modification means, responsive to the input value, for generating an approximation value represented by at least one electrical signal;
   B) read only memory (ROM), responsive to the modification means, for utilizing the approximation value to determine a first intermediate value represented by at least one electrical signal;
   C) error generator means, responsive to the input value and the modification means, for utilizing the input value and the approximation value to generate an error value represented by at least one electrical signal;
   D) correction evaluator means, responsive to the error generator means, for utilizing the error value to determine a correction value represented by at least one electrical signal; and
   E) combining means, responsive to the read only memory (ROM) and the correction evaluator means, for utilizing the first intermediate value and the correction value to obtain the output logarithm approximation value having the desired degree of accuracy and being represented by at least one electrical signal.

2. The apparatus of claim 1, wherein the approximation value is selected from a predetermined set of values.

3. The apparatus of claim 2, wherein the predetermined set of values is a group of values predetermined by selected rounding algorithms.

4. The apparatus of claim 1, wherein the first function generator means further includes at least:
   A) second function generator means, responsive to the modification means, for utilizing the approximation value to determine a first logarithm value having a predetermined base;
   B) third function generator means, responsive to the predetermined base of the first logarithm value, for determining a second logarithm value; and
   C) first scaling means, responsive to the second function generator means and the third function generator means, for utilizing the second logarithm value to scale the first logarithm value, substantially obtaining the first intermediate value.

5. The apparatus of claim 4, wherein the the second logarithm value is substantially a natural base logarithm of the predetermined base of the first logarithm value.

6. The apparatus of claim 4, wherein the first scaling means includes at least first multiplication means for multiplying the first logarithm value by the second logarithm value to substantially yield the first intermediate value.

7. The apparatus of claim 1, wherein the error generator means further includes at least:
   A) first division means, responsive to the input value, and the modification means, for utilizing the input value and the approximation value to obtain a first quotient value of the input value and the approximation value; and
   B) subtraction means, responsive to the first division means, for utilizing the first quotient value to determine the error value, the error value substantially being a difference of the first quotient value and the number one.

8. The apparatus of claim 1, wherein the correction evaluator means responsive to the error generator means further includes at least:
   determining means, responsive to the error generator means for utilizing the error value together with a predetermined number of terms of a predetermined mathematical series to substantially evaluate a predetermined number of terms, and for substantially summing the evaluated predetermined number of terms obtained thereby, obtaining a second sum, the second sum being substantially the correction value.

9. The apparatus of claim 8, wherein the predetermined number of terms is a subset of terms from the predetermined mathematical series and wherein the number of terms in the subset is selected to be greater than or equal to one less than a quotient of a number of bits of accuracy of the output logarithm value divided by a number of bits of accuracy of a first logarithm value.

10. The apparatus of claim 9, wherein the predetermined mathematical series is substantially a power series.

11. The apparatus of claim 10, wherein the power series is substantially a Taylor series for a natural logarithm of a first sum of one plus the error value, substantially being:

$$\sum_{n=1}^{\infty} (-1)^{n+1} \left( \frac{c^n}{n} \right)$$

where c = the error value.

12. The apparatus of claim 8, wherein the determining means includes at least evaluation means for substantially evaluating the predetermined number of terms of the predetermined mathematical series and first addition means for substantially summing the predetermined number of terms of the predetermined mathematical series to yield a second sum, substantially being the correction value.

13. The apparatus of claim 1, wherein the combining means responsive to the first function generator means and the correction evaluator means further includes:
   A) second addition means, responsive to the first function generator means and the correction evaluator means, for determining a third sum of the correction value and the first intermediate value;
   B) fourth function generator means, responsive to the desired base of the output logarithm value, for determining a third logarithm value; and
   C) second division means, responsive to the second addition means and the fourth function generator means, for determining a second quotient of the third sum and the third logarithm value.

14. The apparatus of claim 13, wherein the third logarithm value is substantially a natural base logarithm of the desired base of the output logarithm value.

15. The apparatus of claim 13, wherein the second quotient of the third sum and the third logarithm value is substantially the output logarithm value having the desired base.

16. A high performance digital processing unit for determining an output logarithm approximation, having a desired degree of accuracy and being represented by at least one electrical signal, of an input value, such that the output logarithm has a desired base, comprising:
   A) modification means, responsive to the input value, for generating an approximation value represented bu at least one electrical signal;
   B) read only memory (ROM), responsive to the modification means, for utilizing the approximation value to determine a first intermediate value represented by at least one electrical signal;
   C) error generator means, responsive to the input value and the modification means, for utilizing the input value and the approximation value to generate an error value represented by at least one electrical signal;
   D) correction evaluator means, responsive to the error generator means, for utilizing the error value to determine a correction value represented by at least one electrical signal;
   E) first addition means, responsive to the read only memory (ROM) and the correction evaluator means, for adding the first intermediate value and the correction value to obtain a second intermediate value represented by at least one electrical signal;
   F) second function generator means, responsive to the desired base of the output logarithm approximation value, for determining a second logarithm value, being substantially a natural logarithm of the desired base of the output logarithm approximation value and being represented by at least one electrical signal; and
   G) first division means, responsive to the first addition means and the second function generator means, for determining a first quotient of the second intermediate value and the second logarithm value, such that the first quotient is substantially the output logarithm approximation value having the desired base and having the desired degree of accuracy and being represented by at least one electrical signal.

17. The apparatus of claim 16, wherein the approximation value is selected from a predetermined set of values.

18. The apparatus of claim 17, wherein the predetermined set of values is a group of values predetermined by selected rounding algorithms.

19. The apparatus of claim 16, wherein the first function generator means further includes at least:
   A) third function generator means, responsive to the modification means, for utilizing the approximation value to determine a third logarithm value having a predetermined base;
   B) fourth function generator means, responsive to the predetermined base of the third logarithm value, for determining a fourth logarithm value; and
   C) first scaling means, responsive to the third function generator means and the fourth function generator means, for utilizing the fourth logarithm value to scale the third logarithm value, obtaining substantially the first intermediate value.

20. The apparatus of claim 19, wherein the the fourth logarithm value is substantially a natural base logarithm of the predetermined base of the third logarithm value.

21. The apparatus of claim 19, wherein the first scaling means substantially includes at least first multiplication means for multiplying the third logarithm value by the fourth logarithm value to substantially yield the first intermediate value.

22. The apparatus of claim 16, wherein the error generator means further includes at least:
   A) second division means, responsive to the input value, and the modification means, for utilizing the input value and the approximation value to obtain a second quotient value of the input value divided by the approximation value; and
   B) subtraction means, responsive to the second division means, for utilizing the second quotient value to determine the error value, the error value substantially being a difference of the second quotient value and the number one.

23. The apparatus of claim 16, wherein the correction evaluator means responsive to the error generator means further includes at least:
   determining means, responsive to the error generator means for utilizing the error value together with a predetermined number of terms of a predetermined mathematical series to substantially evaluate a predetermined number of terms, and for substantially summing the evaluated predetermined number of terms obtained thereby, obtaining a second sum, the second sum being substantially the correction value.

24. The apparatus of claim 23, wherein the predetermined number of terms of the predetermined mathematical series is a subset of terms from the predetermined mathematical series and wherein the number of terms in the subset is selected to be greater than or equal to one less than a quotient of a number of bits of accuracy of the output logarithm value divided by a number of bits of accuracy of the first logarithm value.

25. The apparatus of claim 24, wherein the predetermined mathematical series is substantially a power series.

26. The apparatus of claim 25, wherein the power series is substantially a Taylor series for a natural logarithm of a first sum of one plus the error value, substantially being:

$$\sum_{n=1}^{\infty} (-1)^{n+1} \left( \frac{c^n}{n} \right)$$

where c = the error value.

27. The apparatus of claim 23, wherein the determining means includes at least evaluation means for substantially evaluating the predetermined number of terms of the predetermined mathematical series and first addition means for substantially summing the predetermined number of terms of the predetermined mathematical series to yield a second sum, substantially being the correction value.

28. An apparatus for processing an input value, x, to provide a output logarithm approximation value having a desired base m of the input value, {log $_m$ (x)}, the output logarithm approximation value having a desired degree of accuracy and being represented by at least one electrical signal, comprising:
 A) modification means responsive to the input value, x, for generating an approximation value, a, represented by at least one electrical signal;
 B) read only memory (ROM) responsive to the modification means for utilizing the approximation value to determine a first intermediate value, substantially {ln (a)}, represented by at least one electrical signal;
 C) error generator means responsive to the input value, x, and the modification means for utilizing the input value, x, and the approximation value, a, to generate an error value, c, represented by at least one electrical signal;
 D) correction evaluator means responsive to the error generator means for utilizing the error value, c, to determine a correction value represented by at least one electrical signal; and
 E) combining means responsive to the read only memory (ROM) and the correction evaluator means for combining the first intermediate value with the correction value to obtain the output logarithm approximation value, {log $_m$ (x)}, having the desired degree of accuracy and being represented by at least one electrical signal.

29. The apparatus of claim 28, wherein the approximation value is selected from a predetermined set of values.

30. The apparatus of claim 29, wherein the predetermined set of values is at least a predetermined set of rounding algorithm values.

31. The apparatus of claim 28, wherein the first function generator means further includes at least:
 A) second function generator means, responsive to the modification means, for utilizing the approximation value, a, to determine a first logarithm value, {log $_p$ (a)}, with at least a predetermined degree of accuracy, a predetermined precision, and a base p;
 B) third function generator means, responsive to the desired base of the first logarithm value, for determining a third natural base logarithm value, {ln (p)}, of the base of the first logarithm value; and
 C) first scaling means, responsive to the second function generator means and the third function generator means, for scaling the first logarithm value to obtain the first intermediate value, substantially {ln (a)}, having at least the predetermined degree of accuracy and a base e.

32. The apparatus of claim 31, wherein the predetermined degree of accuracy is less accurate than or as accurate as the desired degree of accuracy of the output logarithm value and the predetermined degree of precision is at least as precise as the desired degree of accuracy of the output logarithm value.

33. The apparatus of claim 31, wherein the first scaling means includes at least second multiplication means for substantially multiplying the first logarithm value, {log $_p$ (a)}, by a factor essentially equivalent to, a natural base logarithm of p, the base of the first logarithm to substantially determine the first intermediate value.

34. The apparatus of claim 28, wherein the error generator means further includes at least:
 A) first division means responsive to the input value, x, and the modification means, for utilizing the input value, x, and the approximation value, a, to obtain a first quotient value, x/a, of the input value, x, divided by the approximation value, a; and
 B) subtraction means responsive to the first division means, for utilizing the first quotient value, x/a, and the number one to substantially obtain the error value, c = {(x/a) − 1}.

35. The apparatus of claim 28, wherein the correction evaluator means responsive to the error generator means further includes at least:
 determining means, responsive to the error generator means for utilizing the error value together with a predetermined number of terms of a predetermined mathematical series to substantially evaluate a predetermined number of terms, and for substantially summing the evaluated predetermined number of terms obtained thereby, obtaining a second sum, the second sum being substantially the correction value.

36. The apparatus of claim 35, wherein the predetermined number of terms of the predetermined mathematical series is a subset of terms from the predetermined mathematical series and wherein the number of terms in the subset is selected to be greater than or equal to one less than a quotient of a number of bits of accuracy of the output logarithm value divided by a number of bits of accuracy of the first logarithm value.

37. The apparatus of claim 36, wherein the predetermined mathematical series is substantially:

$$\sum_{n=1}^{\infty} (-1)^{n+1} \left( \frac{c^n}{n} \right)$$

where c = the error value.

38. The apparatus of claim 35, wherein the determining means includes at least evaluation means for substantially evaluating the predetermined number of terms of the predetermined mathematical series and first addition means for substantially summing the predetermined number of terms of the predetermined mathematical series to yield a second sum, substantially being the correction value.

39. The apparatus of claim 28, wherein the combining means further includes at least:
 A) second addition means responsive to the first function generator means and the correction evaluator means for utilizing the first intermediate value and the correction value to determine a second sum, the second sum being substantially the natural base logarithm value of the input x, {ln (x)}; and B) fourth division means responsive to the second addition means and the third function generator means for substantially determining a third quotient of the natural base logarithm value of the input value x, {ln (x)} and a natural logarithm of m, the desired base of the output logarithm value, {ln (m)}, yielding substantially $$\{\ln(x)\}/\{\ln(m)\} = \{\log_m(x)\},$$

the output logarithm value with the desired base, {log$_m$ (x)}.

* * * * *